UNITED STATES PATENT OFFICE.

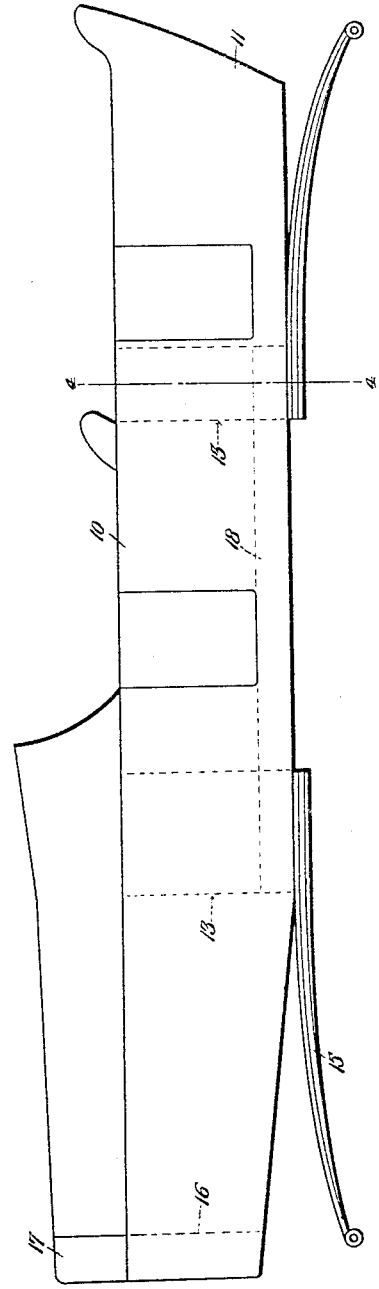
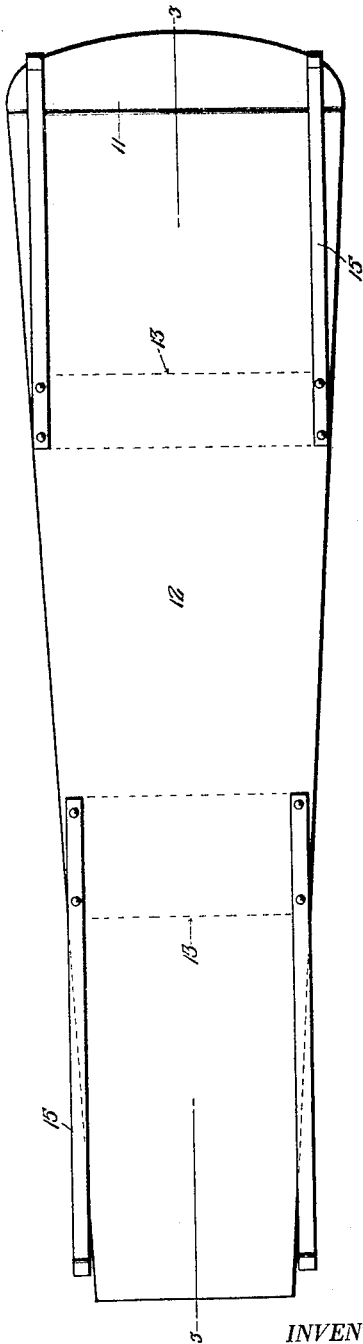

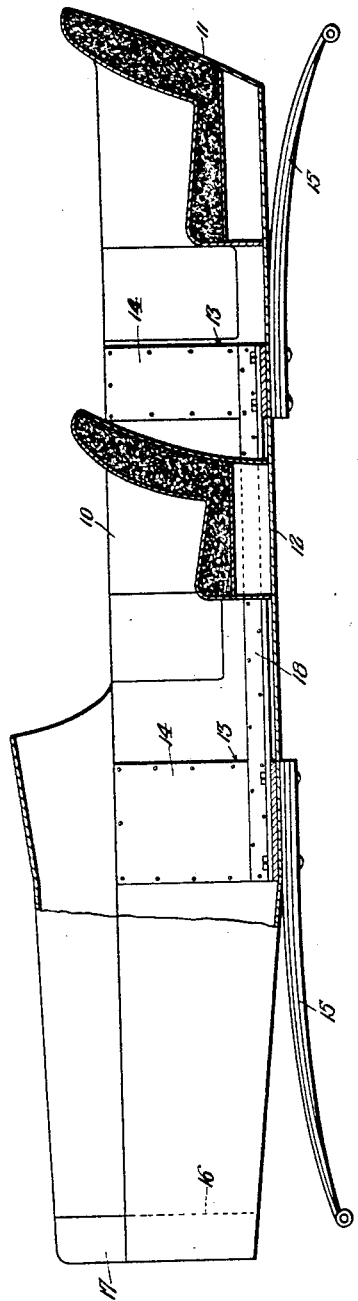

WILIAM LINQUIST, OF CLEVELAND, OHIO.

AUTO-BODY.

1,398,102.  Specification of Letters Patent.  Patented Nov. 22, 1921.

Application filed July 15, 1919. Serial No. 310,882.

*To all whom it may concern:*

Be it known that I, WILIAM LINQUIST, a citizen of the United States, residing at Cleveland, in the county of Cuyahoga and State of Ohio, have invented new and useful Improvements in Auto-Bodies, of which the following is a specification.

This invention relates to vehicle construction and particularly to the construction of motor operated vehicles.

An object of the invention is to provide a structure which combines both the body and chassis in such manner as to reduce weight and increase the strength and rigidity of the structure and further to cheapen the cost of manufacture.

To this end, the invention eliminates the usual side members of the chassis and reinforces the body, so as to permit of the use of the latter as a substitute for the side members, the body supporting springs being secured to the reinforcing means and bearing the weight of the body.

The invention further includes the following novel features and details of construction, to be hereinafter more fully described and illustrated in the accompanying drawings.

In the drawings:

Figure 1 is a side elevation of a vehicle body embodying the present invention, the reinforcing members being shown by dotted lines.

Fig. 2 is a bottom plan view of the same.

Fig. 3 is a longitudinal section on the line 3—3 of Fig. 2.

Fig. 4 is a section on the line 4—4 of Fig. 1.

Referring to the drawings in detail, wherein like characters of reference denote corresponding parts, the vehicle body includes side members 10, which are connected at their rear by a transverse member 11, so as to form the side and rear end of the body, the latter being provided with a bottom 12. This body may be constructed of sheet metal of sufficient thickness to lend strength to the body, but not thick enough to add materially to its weight.

The body is reinforced at intervals throughout its length by transversely disposed substantially U-shaped members 13, the latter comprising a base, which is secured to the bottom of the vehicle, and sides 14 secured to the sides of the vehicle. These members 13 are connected by longitudinally extending angle bars 18.

The springs, which are herein shown of the cantaliver type, are indicated at 15, and have one end secured to the reinforcing members 13 in any desired manner, while their opposite ends are secured in the usual or any preferred manner to the front and rear axles of the vehicle.

The extreme front end of the vehicle body is provided with a U-shaped reinforcing member 16, which is secured to the bottom and sides of the body and serves as a means for securing a radiator 17.

By means of the structure just described, there is provided an exceedingly strong and rigid body of light and durable character, the weight of the structure being materially reduced by the elimination of the usual side and cross members of the ordinary chassis, so that the cost of the structure will be reduced.

The invention is susceptible of various changes in its form, proportions and minor details of construction and the right is herein reserved to make such changes as properly fall within the scope of the appended claim.

Having described the invention, what is claimed is:

In a vehicle construction, a body including a bottom, sides and ends, spaced relatively wide U-shaped reinforcing members secured within and extending transversely across the body, angle irons secured within the corners of and connecting said members, and extending longitudinally of the body, whereby a supporting frame is provided for connection with the springs of a vehicle.

In testimony whereof I affix my signature.

WILIAM LINQUIST.